United States Patent
Shiraishi et al.

[19]

[11] Patent Number: 6,163,953
[45] Date of Patent: *Dec. 26, 2000

[54] MANUFACTURING METHOD OF A SUSPENSION

[75] Inventors: Masashi Shiraishi, Nagano; Shunichi Kudo, Yamanashi; Haruyuki Morita, Nagano; Akihiro Takei, Kanagawa; Ichiro Takadera, Tokyo, all of Japan

[73] Assignees: TDK Corporation; NHK Spring Co., LTD, both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/033,582

[22] Filed: Mar. 3, 1998

Related U.S. Application Data

[62] Division of application No. 08/736,436, Oct. 24, 1996, Pat. No. 5,754,368.

[30] Foreign Application Priority Data

Oct. 27, 1995 [JP] Japan .................................... 7-302281
Oct. 27, 1995 [JP] Japan .................................... 7-302282

[51] Int. Cl.[7] .................................................... G11B 5/42
[52] U.S. Cl. ................................. 29/603.03; 29/603.04; 360/104
[58] Field of Search .......................... 29/603.03, 603.04, 29/603.05, 603.06; 360/103, 104, 108

[56] References Cited

U.S. PATENT DOCUMENTS

| | | | |
|---|---|---|---|
| 4,167,765 | 9/1979 | Watrous | 360/103 |
| 5,027,239 | 6/1991 | Hagen | 360/104 |
| 5,055,969 | 10/1991 | Putnam | 361/398 |
| 5,121,273 | 6/1992 | Slezak | 360/104 |
| 5,453,315 | 9/1995 | Hamilton . | |
| 5,476,131 | 12/1995 | Hamilton . | |
| 5,490,027 | 2/1996 | Hamilton et al. | 360/104 |
| 5,491,597 | 2/1996 | Bennin et al. | 360/104 |
| 5,519,552 | 5/1996 | Kohira et al. | 360/104 |
| 5,606,477 | 2/1997 | Erpelding et al. | 360/104 |
| 5,608,591 | 3/1997 | Klaassen | 360/104 |
| 5,708,541 | 1/1998 | Erpelding | 360/104 |
| 5,710,682 | 1/1998 | Arya et al. | 360/106 |
| 5,844,750 | 12/1998 | Takaike | 360/104 |
| 5,864,446 | 1/1999 | Endo et al. | 360/104 |
| 5,903,413 | 5/1999 | Brooks, Jr. et al. | 360/106 |

FOREIGN PATENT DOCUMENTS

| | | |
|---|---|---|
| 63-55209 | 4/1988 | Japan . |
| 4-40680 | 2/1992 | Japan . |
| 4-93915 | 8/1992 | Japan . |
| 5-282642 | 10/1993 | Japan . |
| 7-262541 | 10/1995 | Japan . |
| 8-045213 | 2/1996 | Japan . |

*Primary Examiner*—Carl E. Hall
*Attorney, Agent, or Firm*—Arent Fox Kintner Plotkin & Kahn, PLLC

[57] ABSTRACT

A suspension includes a resilient flexure for supporting a magnetic head slider near its one end, and a load beam with a base end portion, for supporting the flexure. Particularly, connection conductors are formed on the flexure in a thin film pattern, and one ends of the connection conductors are to be connected to the magnetic head slider and the other ends of the connection conductors are positioned near the other end of the flexure. The other end of the flexure extends to at least a position of the base end portion of the load beam.

3 Claims, 16 Drawing Sheets

MANUFACTURING METHOD OF A SUSPENSION

This application is a divisional application of Ser. No. 08/736,436 U.S. Pat. No. 5,754,368, filed Oct. 24, 1996.

FIELD OF THE INVENTION

The present invention relates to a suspension, a slider-suspension assembly, an assembly carriage device and a method of manufacturing the suspension, used in a magnetic disk drive apparatus or a photo-magnetic disk drive apparatus wherein a magnetic head slider opposes to the surface of a rotating magnetic or photo-magnetic disk with a very low flying height so as to read and write information from and into the disk.

DESCRIPTION OF THE RELATED ART

The suspension supports a magnetic head slider near its one end and applies a pressure force against the slider toward the disk surface. This pressure force is compensated by the force of the air-bearing between an air-bearing surface of the slider and the rotating disk surface. Thus, the slider can be moved on the rotating disk surface with keeping a small space between them so as to read and write information from and into the disk.

U.S. Pat. No. 4,167,765 of Watrous discloses a typical suspension structure with a load beam mounted at one end to a rigid actuator arm, and a flexure element which is attached to the other end of the load beam and support a magnetic head slider. The load beam provides the resilient spring action for biasing the slider toward the disk surface, while the flexure element provides flexibility for the slider as the slider rides on the cushion of air between the air-bearing surface and the rotating disk surface. Suspensions with such structure are commercially supplied as type T-8 or T-19 suspensions from Hutchinson Technology Inc. and widely utilized in this field.

In general, the magnetic head slider is supported by the flexure part of the suspension having the above-mentioned structure and a plurality of wires are provided for lead lines of the magnetic head slider. Namely, one end of each of the wires is electrically connected to each signal terminal of the magnetic head slider, whereas the other end of the each wire is electrically connected to a cable terminal formed at one end of a flexible printed circuit (FPC) which is connected at the other end thereof to an integrated circuit element for recording and reproducing signals mounted in the magnetic or photo-magnetic disk drive apparatus.

Recent requirement for higher magnetic recording density has promoted an extremely lower flying height of the magnetic slider such as 0.1 $\mu$m or less and a lower size of the slider itself as well as a lower resilient pressure force against the slider toward the disk surface.

For such downsized magnetic head slider, rigidity of the lead wires will greatly exert a bad influence upon the flying characteristics of the slider. Particularly, motion for roll of the slider is severely affected by the rigidity of these wires. In addition, downsizing of the slider will invite great difficulty of connection work of the wires with the signal input/output terminals of the slider. Using of the lead wires also requires additional works for connecting the other end of the wires with a plurality of cable terminals formed on the FPC. Since this connection work has to be executed by hand, one by one, the operation efficiency of manufacturing the slider-suspension assembly will be extremely lowered. In addition, it requires skill for the workers.

Suspensions with improved structure which can solve the above-mentioned problems of the typical suspension are described in Japanese Patent Unexamined Publication Nos. 4(1992)-40680 and 5(1993)-282642. In each of these known suspensions, a thin film conductive pattern as for lead lines is formed on the flexure which is supported by the load beam at its one end, and one ends of the lead lines of the conductive pattern are connected directly with signal terminals of the magnetic head slider mounted on the flexure. Thus, according to these improved suspensions, complicated connection work of the wires with the slider due to downsizing of the slider can be avoided, and also the flying height change as well as low durability of the device due to the rigidity of the wires can be prevented.

However, in these known suspensions, the flexure with the thin film conductive pattern as for lead lines is partially formed only a small region near the top end of the load beam, at which the slider is mounted, and therefore wires have to be likewise used for electrically connecting the other ends of the lead lines of the conductive pattern with an external circuit (one end of the FPC). Thus, following problems will be occurred.

If the wires with a large diameter are used for the connection with the external circuit to decrease their electrical resistance, the rigidity of these wires greatly exert a bad influence upon the flying characteristics of the downsized slider. Contrary to this, if the wires with a small diameter are used, the electrical resistance will extremely increase and also breakage of the wires may easily occur at the connection work causing fraction defective of manufacturing to increase.

Also, since it is necessary to carry out double connection works for connecting the conductive pattern with one ends of the wires and for connecting the other ends of the wires with the cable terminals at the one end of the FPC, the connection works become so much complicated. Furthermore, since these connection works have to be executed by hand, one by one, the operation efficiency of manufacturing the slider-suspension assembly becomes extremely low. In addition, it requires skill for the workers. Because of connection with the wires, breakage may also easily occur at the connection works causing fraction defective of manufacturing to increase. Particularly, if small diameter wires are used in order to decrease bad influence upon the flying characteristics of the downsized slider, breakage of the wires will very easily occur at the connection works causing the fraction defective of manufacturing to greatly increase.

SUMMARY OF THE INVENTION

It is therefore an object of the present invention to provide a suspension, a slider-suspension assembly and an assembly carriage device, whereby connection of lead lines of a magnetic head slider will not affect the flying characteristics of the slider, particularly motion of the slider for roll.

Another object of the present invention is to provide a suspension, a slider-suspension assembly and an assembly carriage device, whereby an electrical resistance of lead lines to be connected with a magnetic head slider can be decreased.

Further object of the present invention is to provide a suspension, a slider-suspension assembly, an assembly carriage device and a method of manufacturing the suspension, whereby connection work between lead lines and an external circuit can be easily executed resulting the manufacturing cost with respect to the connection to reduce.

The present invention relates a suspension including a resilient flexure for supporting a magnetic head slider near its one end, and a load beam with a base end portion, for supporting the flexure. Particularly, according to the present invention, connection conductors are formed on the flexure in a thin film pattern, and one ends of the connection conductors are to be connected to the magnetic head slider and the other ends of the connection conductors are positioned near the other end of the flexure. The other end of the flexure extends to at least a position of the base end portion of the load beam.

Also, the present invention relates a slider-suspension assembly including a magnetic head slider, a resilient flexure for supporting the magnetic head slider near its one end, and a load beam with a base end portion, for supporting the flexure. Particularly, according to the present invention, connection conductors are formed on the flexure in a thin film pattern, and one ends of the connection conductors are connected to the magnetic head slider and the other ends of the connection conductors are positioned near the other end of the flexure. The other end of the flexure extends to at least a position of the base end portion of the load beam.

The connection conductors are formed on the flexure in a thin film pattern. One ends of the connection conductors are electrically connected to the magnetic head slider and the other ends of the connection conductors are positioned near the other end of the flexure. The other end of the flexure extends to at least a position of the base end portion of the load beam. Thus, the other ends of the respective connection conductors can be directly connected, without using lead wires, to cable terminals of the FPC connection cable. The other end of the connection cable is connected to an electronic circuit for recording and reproducing signals. As a result, the connection of the lead lines will not affect the flying characteristics of the slider, particularly motion of the slider for roll, and an electrical resistance of the lead lines can be decreased. This is extremely advantageous for a magnetic head slider with a very small size, and also for a magnetic head slider with a large number of lead lines. Also, the connection work of the lead lines with the external circuit can be very easily executed and may be automatically executed by a connection machine. As a result, the manufacturing cost with respect to the connection can be reduced. Furthermore, since the flexure is attached to the load beam along the whole length of the load beam, a good damper effect can be expected.

It is preferred that the other end of the flexure is positioned at the side of the base end portion of the load beam or extends beyond the side of the base end portion of the load beam.

It is also preferred that the other ends of the connection conductors are connected to connection terminals positioned near the other end of the flexure, respectively.

The other end of the flexure may be fixed to the load beam or may be free from the load beam to form a free end.

Preferably, the magnetic head slider is a slider having at least four signal terminals connected to the one ends of the connection conductors, respectively, and an air bearing surface with an area equal to or less than 2 mm$^2$.

According to the present invention, furthermore, the load beam may include a terminal support part protruded from a side edge of the base end portion of the load beam and bent to an arbitrary angle with respect to a surface of the base end portion. A first connection terminal part positioned near the one end of the flexure and to be connected to the magnetic head slider, a second connection terminal part positioned near the other end of the flexure, and connection conductors with both ends connected with the first and second connection terminal parts may be formed on the flexure in a thin film pattern. The other end of the flexure is fixed to the terminal support part so that the second connection terminal part is outward appeared with respect to the base end portion at a position of the terminal support part.

The second connection terminal part of the thin film conductive pattern formed on the flexure is positioned on the terminal support part by attaching the other end portion of the flexure to this terminal support part which is protruded from the base end portion of the load beam. Thus, the second connection terminal part can be directly connected, without using lead wires, to one end of a FPC connection cable, the other end of which is connected to an external circuit such as an electronic circuit for recording and reproducing signals. As a result, the connection of the lead lines will not affect the flying characteristics of the slider, particularly motion of the slider for roll, and an electrical resistance of the lead lines can be decreased. Also, any breakage of the wires can be prevented from occurring during connection works resulting the fraction defective of manufacturing to maintain without increasing.

Furthermore, since the second connection terminal part is fixed to the terminal support part which is bent to an arbitrary angle with respect to the surface of the base end portion of the load beam, the connection terminals are outward appeared resulting that the connection work with the FPC can be easily done. Also, because the position of the connection terminals is settled, the connection work of the lead lines with the external circuit can be automatically executed by a connection machine. As a result, the manufacturing cost with respect to the connection can be reduced. Furthermore, since the flexure is attached to the load beam along the whole length of the load beam, a good damper effect can be expected.

It is preferred that the flexure includes a free movement part near the other end of the flexure, and that this free movement part is capable of freely moving with respect to the load beam. Therefore, even if the flexure is fixed at its the other end to the terminal support part of the load beam, the free movement part can freely move with respect to the load beam without sharply bent. Thus, excess stress will not be applied to the thin film conductive pattern on the flexure such as the connection conductors. This can prevent the electrical characteristics such as electrical insulation or resistance of the conductive pattern from deteriorating.

It is also preferred that the flexure includes a play to provide an anti-twist function in the free movement part. Thanks for the play, the free movement part can more freely move. As a result, no excess stress is applied to the thin film conductive pattern on the flexure even if a part of the flexure is distorted during the bending. Therefore, it is very advantageous for preventing the electrical characteristics from deteriorating.

In one embodiment of the present invention, the terminal support part is substantially bent perpendicular to a surface of the base end portion of the load beam. However, this bending angle may be adaptively decided on condition that the connection work with the external circuit can be easily executed. Smaller bending angle is advantageous because the protruding length of the terminal support part will be decreased.

Preferably, the load beam includes a slit along a line for bending the terminal support part. This partial formation of the slit along the bending line will provide no excess stress to the thin film conductive pattern on the flexure such as the connection conductors preventing the electrical characteristics such as electrical insulation or electrical resistance characteristics from deteriorating. Of course, the bending work will become easy.

According to the present invention, furthermore, an assembly carriage device includes a carriage having a plurality of drive arms to which the base end portions of the load beams in the above mentioned slider-suspension assemblies are respectively fixed, an actuator for driving the carriage to rotate, and a connection cable of a flexible printed circuit connected at its one end to an external electrical circuit for recording and reproducing signals. The connection cable has cable terminals connected respectively to the other ends of the connection conductors at its the other end.

It is preferred that the flexure includes connection terminals connected respectively to the other ends of the connection conductors near the other end of the flexure. The connection terminals are connected to the cable terminals, respectively.

It is also preferred that the connection terminals and the other end of the flexure are positioned at the side of the base end portion of the load beam or extend beyond the side of the base end portion of the load beam.

According to the present invention also a method of manufacturing a suspension includes a step of forming a resilient flexure having a first connection terminal part positioned near one end of the flexure and to be connected to a magnetic head slider, a second connection terminal part positioned near the other end of the flexure, and connection conductors with both ends connected with the first and second connection terminal parts, in a thin film pattern, a step of forming a load beam having a base end portion and a terminal support part protruded from a side edge of the base end portion of the load beam, a step of attaching the flexure on the load beam so that the second connection terminal part is fixed on the terminal support part, and a step of bending the terminal support part to an arbitrary angle with respect to a surface of the base end portion so that the second connection terminal part is outward appeared with respect to the base end portion at a position of the terminal support part.

Since the terminal support part is bent after the fixing of the other end of the flexure to this terminal support part of the load beam, bending work can be easily done and also the bending angle can be optionally determined.

It is preferred that the load beam forming step includes a step of forming a slit along a line for bending the terminal support part. This slit will provides no excess stress to the thin film conductive pattern on the flexure such as the connection conductors preventing the electrical characteristics such as electrical insulation or electrical resistance characteristics from deteriorating, and also easy bending work.

Further objects and advantages of the present invention will be apparent from the following description of the preferred embodiments of the invention as illustrated in the accompanying drawings.

DESCRIPTION OF THE PREFERRED EMBODIMENTS

Figure 1:
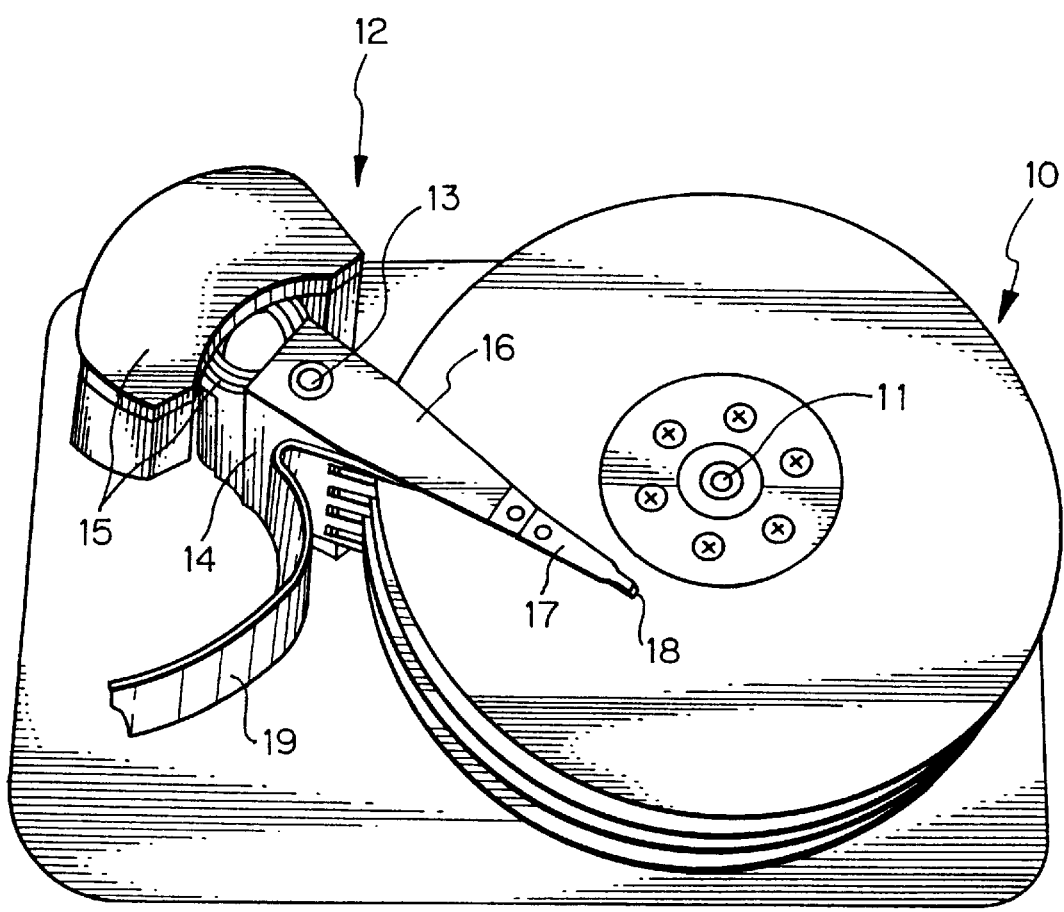
FIG. 1 is an oblique view schematically illustrating a part of a magnetic disk drive apparatus in a preferred embodiment according to the present invention.

In FIG. 1, which schematically illustrates a part of a magnetic disk drive apparatus in a preferred embodiment according to the present invention, reference numeral 10 denotes a plurality of magnetic disks rotating around an axis 11, and 12 denotes an assembly carriage device for positioning a magnetic head slider on a track of the disk. The assembly carriage device 12 is mainly constituted by a carriage 14 rotatable around an axis 13 and an actuator 15 such as for example a voice coil motor (VCM) for driving the carriage 14 to rotate.

Base portions at one ends of a plurality of drive arms 16 are attached to the carriage 14, and a plurality of suspensions 17 are mounted on top portions at the other ends of the arms 16, respectively. A magnetic head slider 18 is fixed to a top end portion of each of the suspensions 17.

A slider-suspension assembly constituted by the suspension 17 and the magnetic head slider 18 fixed to the suspension 17 is attached to the top end portion of the each drive arm 16 so that each of the magnetic head slider 18 opposes to the each surface of the magnetic disks 10. Only one slider-suspension assembly is attached to each of the top and bottom drive arms 16, whereas two slider-suspension assemblies are attached to each of the drive arms 16 between the adjacent magnetic disks.

Branched top portions at one end of a connection cable formed by a flexible printed circuit (FPC) 19 which is connected at the other end thereof to an integrated circuit element for recording and reproducing signals (not shown) are positioned near the top end portions of the respective drive arms 16 of the carriage 14.

Figure 2:
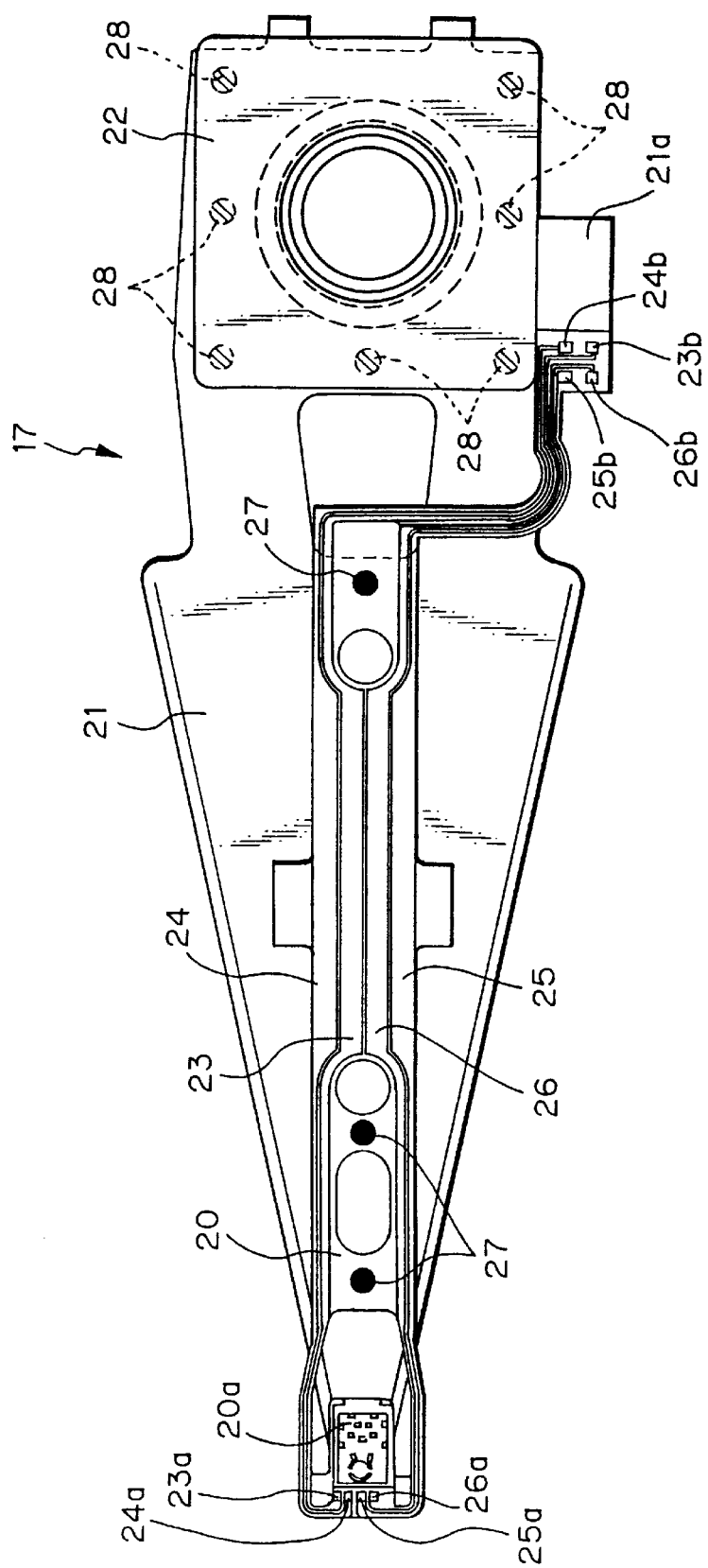
FIG. 2 is a plane view of a suspension used in the embodiment shown in FIG. 1.

FIG. 2 shows the suspension 17 of the embodiment shown in FIG. 1. In the figure, reference numeral 20 denotes the resilient flexure for supporting, by means of its tongue 20a formed near one end of the flexure 20, the magnetic head slider 18 (FIG. 1), 21 denotes the load beam for supporting and fixing the flexure 20, and 22 denotes a base plate fixed to a base end portion of the load beam 21. The other end of the flexure 20 is positioned in this embodiment at the side of a front edge (edge on the slider side) of the base plate 22.

The flexure 20 is made of in this embodiment a stainless steel plate (for example SUS304TA) with a thickness of about 25 $\mu$m. If the flexure is made of a plastic material, a poor flatness of the surface to which the slider is mounted and/or large angle variations between the slider mounting surface and the surface to which the drive arm is attached may occur. However, according to this embodiment, since the flexure 20 is formed by the stainless steel plate, there will occur no such troubles.

As for lead lines, four connection conductors 23–26 of thin film conductive pattern are formed on the flexure 20 along its whole length. Near the both ends of the flexure 20, connection terminals 23a–26a which are to be directly connected to the magnetic head slider 18 (FIG. 1) and connection terminals 23b–26b which are to be directly connected to the connection cable of the FPC 19 (FIG. 1) are formed on the flexure 20, respectively. These connection terminals 23a–26a and 23b–26b are electrically connected with each other by means of the connection conductors 23–26, respectively.

The thin film conductive pattern can be formed by a well known method similar to the patterning method of forming a printed circuit board on a thin metal plate. Namely, the conductive pattern are formed by sequentially depositing a polyimide layer with a thickness of about 5 $\mu$m (lower insulating material layer), a patterned Cu layer with a thickness of about 4 $\mu$m (conductive material layer), and a polyimide layer with a thickness of about 5 $\mu$m (upper insulating material layer) on the flexure 20 in this order. Within the regions of the connection terminals 23a–26a and 23b–26b, a Ni layer and an Au layer are sequentially deposited on the Cu layer and there is no upper insulating material layer. In order to easily understand the structure, the connection conductors 23–26 are indicated by solid lines in FIG. 2.

The load beam 21 is made of in this embodiment a stainless steel plate with a thickness of about 62–76 $\mu$m and supports the flexure 20 along its whole length. Fixing of the flexure 20 to the load beam 21 is achieved by means of means of a plurality of welded spots 27. In this embodiment, this load beam 21 has a terminal support part 21a protruded from the side edge of the base plate 22. On the terminal support part 21a, the other end portion of the flexure 20 with the connection terminals 23b–26b is fixed.

The base plate 22 is made of a stainless steel or iron and is fixed to the base end portion of the load beam 21 by means of welded spots 28. The suspension 17 is attached to the top end portion of the drive arm 16 (FIG. 1) by fixing the base plate 22 thereto. In a modification, the base end portion of the load beam 21 may be constructed to function as a base plate instead of preparing and attaching the individual base plate 22.

Figure 3:
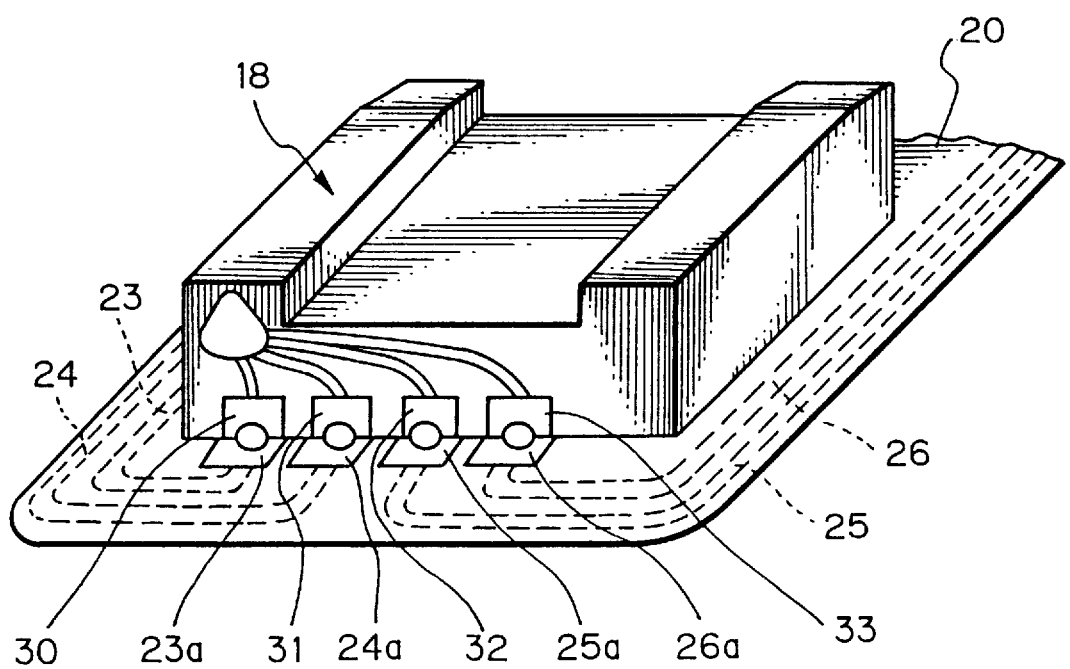
FIG. 3 is an oblique view illustrating an example of connection structure between connection terminals formed near the top end of a flexure of the suspension shown in FIG. 2 and signal terminals of a magnetic head slider.

FIG. 3 illustrates an example of connection structure between the connection terminals 23a–26a near the top end of the flexure 20 and signal terminals of the magnetic head slider 18.

In this example, the magnetic head slider 18 has four signal terminals 30–33 and the air bearing surface with an area of about 1.25 mm$^2$. As will be apparent from this figure, the signal terminals 30–33 of the slider 18 are connected with the connection terminals 23a–26a formed near the top end of the flexure 20 by ball bonding of Au, respectively.

Figure 4:
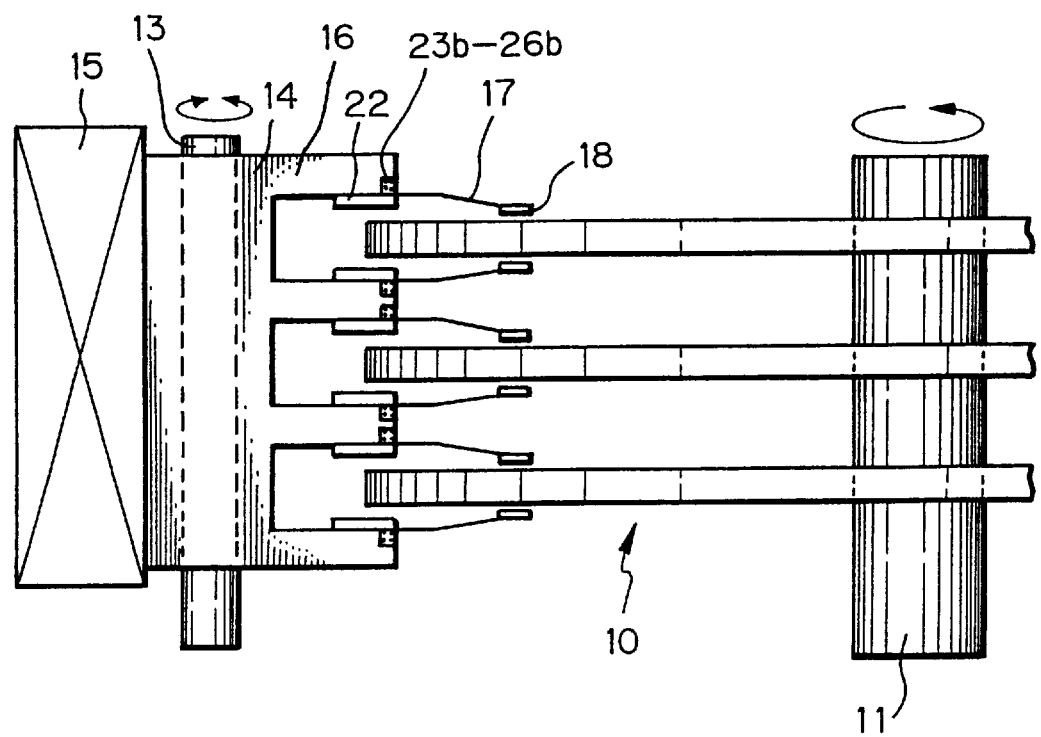
FIG. 4 is a side view schematically illustrating an assembly carriage device used in the embodiment shown in FIG. 1.
Figure 5:
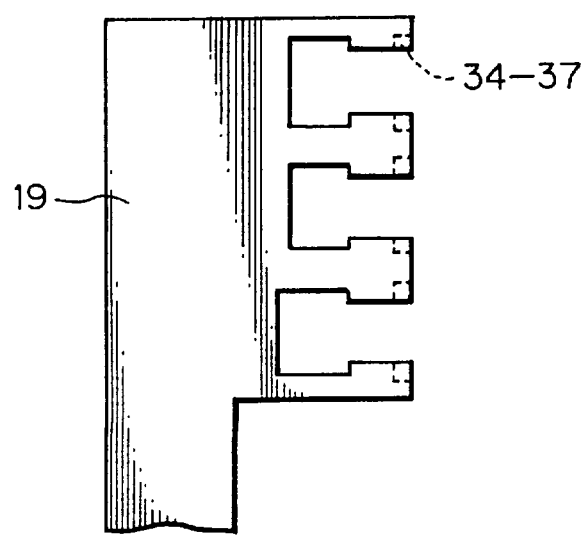
FIG. 5 is a plane view of FPC of the magnetic disk drive apparatus shown in FIG. 1.
Figure 6:
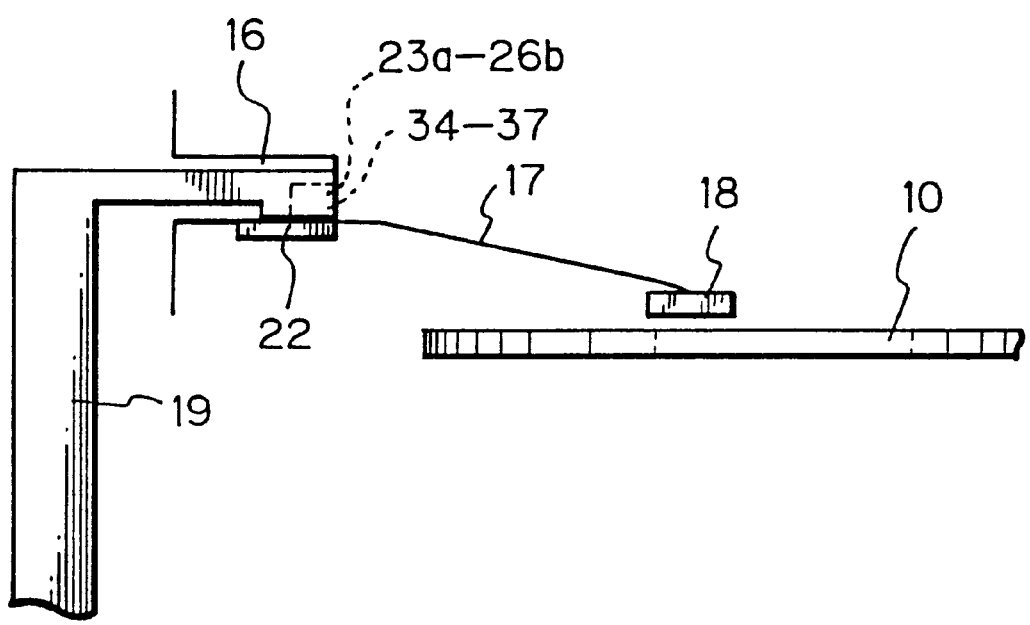
FIG. 6 is a side view schematically illustrating an example of connection structure between connection conductors of the flexure shown in FIG. 2 and a connection cable of the FPC.

Hereinafter, the connection structure between the connection conductors 23–26 of the flexure 20 in this embodiment and the connection cable of the FPC 19 will be described with reference to FIGS. 4 to 6. FIG. 4 schematically illustrates the assembly carriage device 12, FIG. 5 illustrates the FPC 19 and FIG. 6 illustrates the connection structure of a single suspension with the FPC connection cable 19.

The connection terminals 23b–26b electrically connected to the other ends of the respective connection conductors 23–26 of each suspension 17 are positioned near the side edge of the base plate 22, in other words positioned at the top end portion of the drive arm 17 when the suspension 17 is attached to this drive arm 16. As mentioned before, the branched top portions at one end of the connection cable of FPC 19 which is connected at the other end thereof to an integrated circuit element for recording and reproducing signals are positioned near the top ends of the respective drive arms 16. Each of the branched top portions of the connection cable has cable terminals 34–37 which are connected to the connection cable.

Therefore, electrical connection of the lead lines of the each slider-suspension assembly can be completed only by directly connecting, by means of soldering for example, the connection terminals 23b–26b of the flexure 20 with the cable terminals 34–37 of the FPC 19 at the top end position of the drive arm 16.

According to this embodiment, as described above, the connection terminals 23b–26b coupled to the other ends of the respective connection conductors 23–26 can be directly connected, without using lead wires, to the cable terminals 34–37 of the FPC connection cable. The other end of the connection cable is connected to the electronic circuit for recording and reproducing signals. As a result, the connection of the lead lines will not affect the flying characteristics of the slider, particularly motion of the slider for roll, and an electrical resistance of the lead lines can be decreased. This is extremely advantageous for a magnetic head slider with a very small size, and also for a magnetic head slider with a large number of lead lines.

Figure 7:
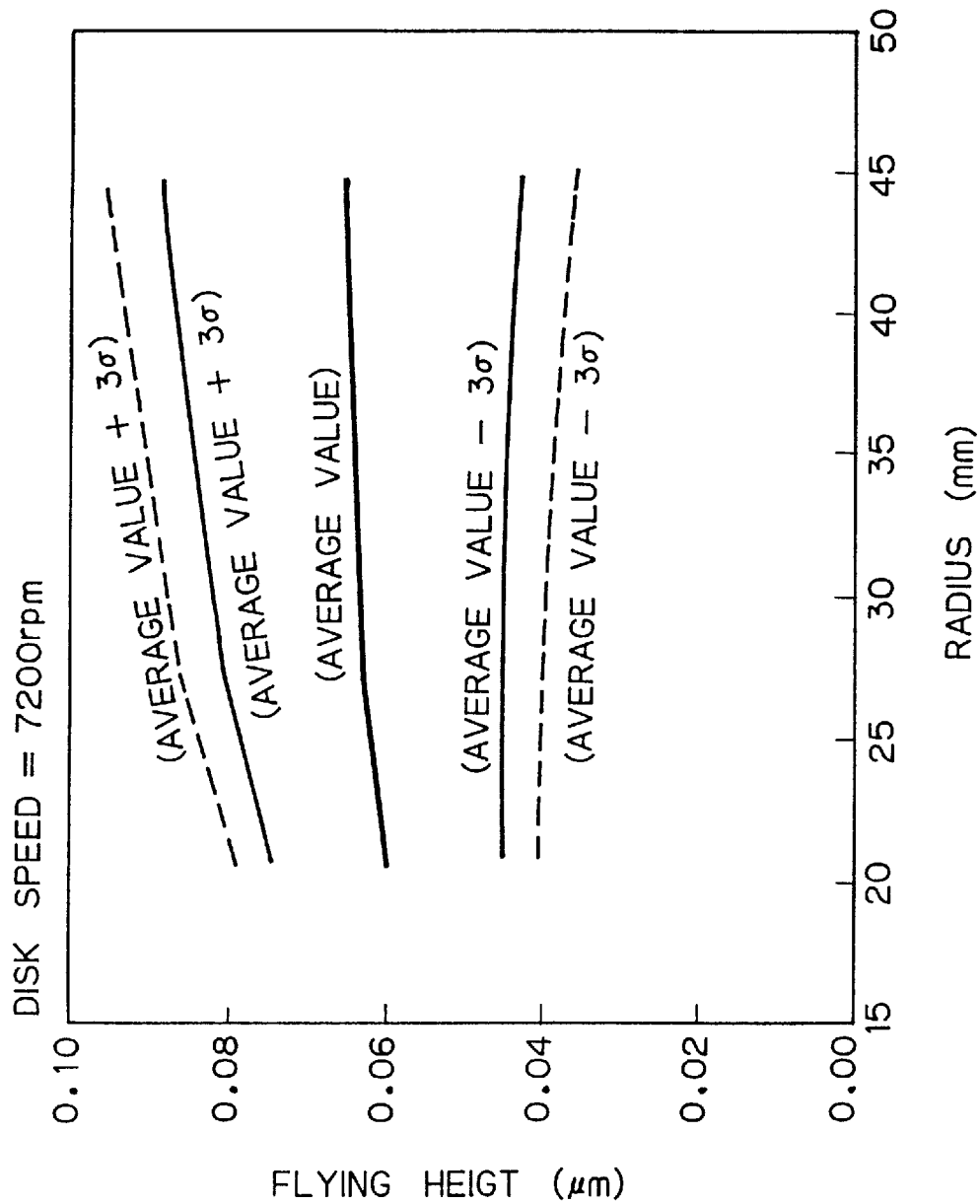
FIG. 7 is a graph illustrating measured flying characteristics of a slider-suspension assembly used in the embodiment of FIG. 1 and of the conventional slider-suspension assembly using wires as for the lead lines.

FIG. 7 illustrates measured flying characteristics of the slider-suspension assembly in this embodiment and of the conventional slider-suspension assembly using wires as for the lead lines. In FIG. 7, (average value), (average value+3$\sigma$) and (average value−3$\sigma$) of the flying height versus position of the slider along the disk radius, with respect to the assembly of this embodiment and to the conventional assembly are illustrated. Solid lines of (average value+3$\sigma$) and (average value −3$\sigma$) correspond to the assembly of this embodiment, and broken lines of (average value+3$\sigma$) and (average value−3$\sigma$) correspond to the conventional assembly. Also, $\sigma$ indicates a standard deviation. These. flying characteristics were measured for 100 samples under the condition of a disk speed of 7200 rpm.

As will be apparent from this figure, the range between (average value+3σ) and (average value−3σ) of the assembly of this embodiment is narrower than that of the conventional assembly by about 30%. This represents that the flying height deviation characteristics is extremely improved in this embodiment.

Also, according to this embodiment, since the electrical connection of the lead lines can be completed only by directly connecting, by means of soldering for example, the connection terminals 23b–26b with the cable terminals 34–37 at the top end position of the drive arm 16, the connection work of the lead lines with the external circuit can be very easily executed and may be automatically executed by a connection machine. As a result, the manufacturing cost with respect to the connection can be reduced.

Furthermore, since the flexure 20 is attached to the load beam 21 along the whole length of the load beam, a good damper effect can be expected. In fact, the result of measured vibration characteristics of the slider-suspension assembly of this embodiment and of the conventional slider-suspension assembly exhibited an increased damper effect in the assembly of this embodiment. Namely, a gain in the second torsion mode was 6 dB in the conventional assembly, whereas 2 dB in the assembly of this embodiment.

Figure 8:
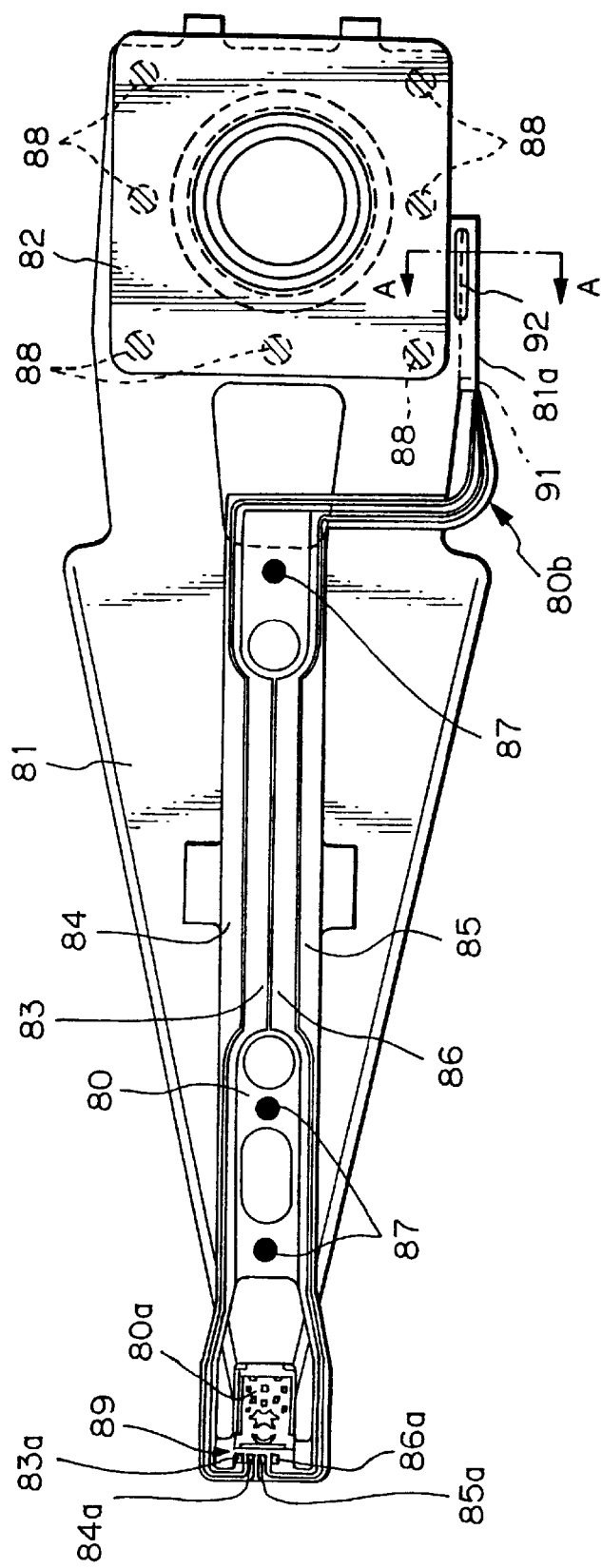
FIG. 8 is a plane view of a suspension used in an another embodiment according to the present invention.

FIG. 8 illustrates a suspension used in an another embodiment according to the present invention.

In the figure, reference numeral 80 denotes a resilient flexure for supporting, by means of its tongue 80a formed near one end of the flexure 80, a magnetic head slider similar to that shown in FIG. 1, 81 denotes a load beam for supporting and fixing the flexure 80, and 82 denotes a base plate fixed to a base end portion of the load beam 81.

Figure 9A:
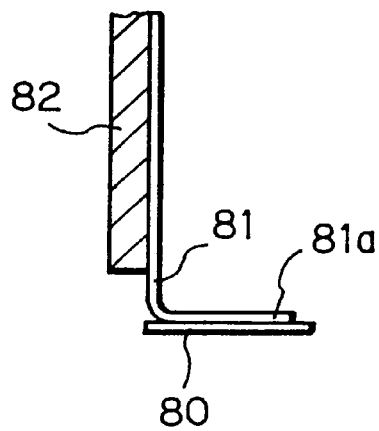
FIGS. 9a to 9c are sectional views along the A—A line shown in FIG. 8.
Figure 9C:
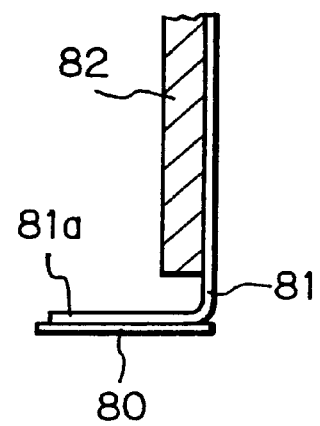
Figure 9B:
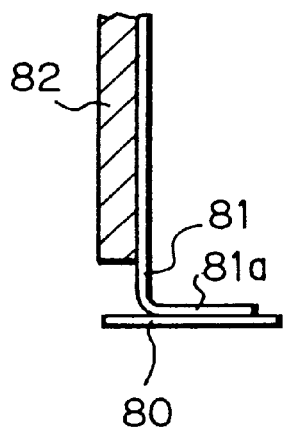

FIGS. 9a to 9c show sectional views along the A—A line shown in FIG. 8. As shown in these figures, the load beam 81 has a terminal support part 81a which is protruded from the side edge of the base plate 82 and is bent to an angle of about 90° with respect to the surface of the base plate 82. On the terminal support part 81a, the other end of the flexure 80 on which a second connection terminal part (90) is positioned is fixed.

Figure 9D:
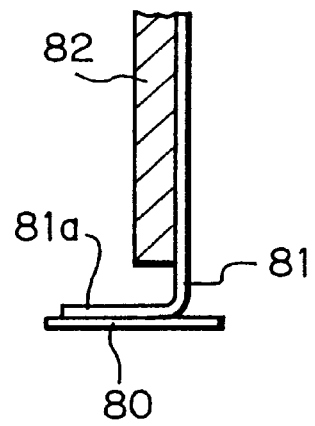

The terminal support part 81a may be perpendicularly bent with respect to the load beam 81 in a direction of the base plate 82 as shown in FIGS. 9c and 9d, or in the opposite direction of the base plate 82 as shown in FIGS. 9a and 9b. The other end portion of the flexure 80 is fixed on the terminal support part 81a so that the second connection terminal part (90) is outward appeared with respect to the base plate 82. It is desired that the terminal support part 81a has a shorter length in the protruding direction as shown in FIGS. 9b and 9d, so that the upward and downward protruding length of this support part can be shortened. Although the terminal support part 81a is bent to an angle of about 90° in this embodiment, this bending angle may be adaptively decided on condition that the connection work with the external circuit can be easily executed. Smaller bending angle is advantageous because the protruding length of the terminal support part 81a will be decreased.

Figure 10:
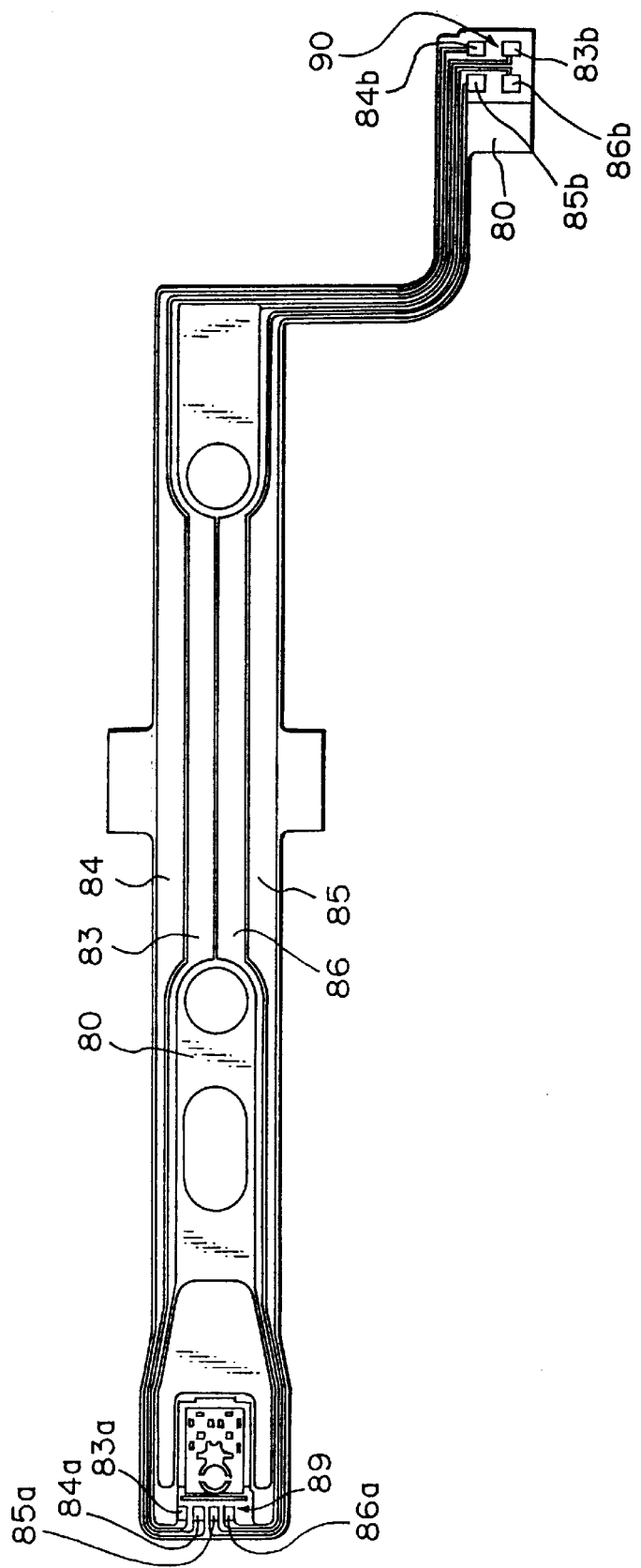
FIG. 10 is a plane view illustrating in detail a flexure used in the embodiment shown in FIG. 8.

The flexure 80 is made of in this embodiment a stainless steel plate (for example SUS304TA) with a thickness of about 25 μm. FIG. 10 illustrates in detail the structure of this flexure 80. As will be understood from this figure, on the flexure 80, four connection conductors 83–86 of thin film conductive pattern are formed along its whole length, as for lead lines. Near one end of the flexure 80, a first connection terminal part 89 consisting of connection terminals 83a–86a which are to be directly connected to the magnetic head slider is formed on the flexure 80 in a configuration of the thin film conductive pattern. Near the other of the flexure 80, the second connection terminal part 90 consisting of connection terminals 83b–86b which are to be directly connected to the connection cable of FPC similar to the FPC 19 shown in FIG. 1 is formed on the flexure 80 in a configuration of the thin film conductive pattern. These connection terminals 83a–86a and 83b–86b are electrically connected with each other by means of the connection conductors 83–86, respectively.

The thin film conductive pattern can be formed by a well known method similar to the patterning method of forming a printed circuit board on a thin metal plate. Namely, the conductive pattern are formed by sequentially depositing a polyimide layer with a thickness of about 5 μm (lower insulating material layer), a patterned Cu layer with a thickness of about 4 μm (conductive material layer), and a polyimide layer with a thickness of about 5 μm (upper insulating material layer) on the flexure 80 in this order. Within the regions of the connection terminals 83a–86a and 83b–86b, a Ni layer and an Au layer are sequentially deposited on the Cu layer and there is no upper insulating material layer. In order to easily understand the structure, the connection conductors 83–86 are indicated by solid lines in FIGS. 8 and 10.

The load beam 81 is made of in this embodiment a stainless steel plate with a thickness of about 62–76 μm and supports the flexure 80 along its whole length by fixing it at a plurality of points. As mentioned above, this load beam 81 has the terminal support part 81a protruded from the side edge of the base plate 82 and bent to an angle of about 90° with respect to the surface of the base plate 82. On the terminal support part 81a, the other end portion of the flexure 80 on which the second connection terminal part 90 is positioned is fixed so that this second connection terminal part 90 is outward appeared with respect to the base plate 82.

Fixing of the flexure 80 to the load beam 81 is achieved at a plurality of welded spots 87 by laser welding for example. Fixing of the other end of the flexure 80 to the terminal support part 81a is also achieved at welded spots (not shown in FIG. 8) by laser welding for example. Since the flexure 80 and the load beam 81 are fixed to each other by means of the welded spots, the flexure 80 will have a free movement part 80b which can freely move with respect to the load beam 81 at a position near the other end of the flexure 80. Therefore, even if the flexure 80 is fixed to the load beam 81, excess stress will not be applied to the thin film conductive pattern on the flexure 80 such as the connection conductors 83–86.

A slit 92 with a certain length may be partially formed along a bending line 91 for the terminal support part 81a, with which the terminal support part 81a is easily bent.

The base plate 82 is made of a stainless steel or iron and is fixed to the base end portion of the load beam 81 by means of welded spots 88. In a modification, the base end portion of the load beam 81 may be constructed to function as a base plate instead of preparing and attaching the individual base plate 82.

Next, a method of manufacturing the suspension in this embodiment will be described.

Figure 11:
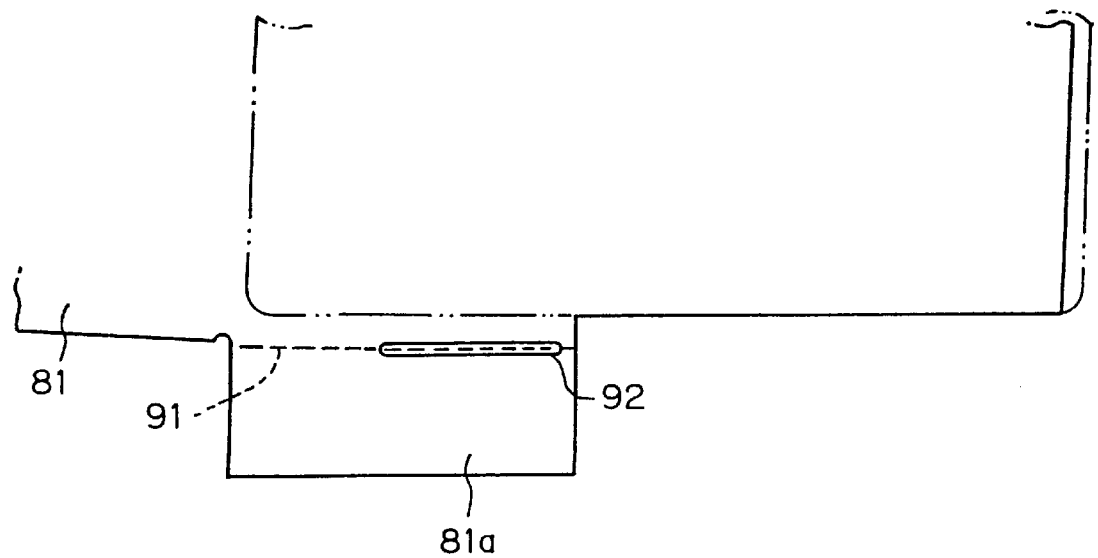
FIG. 11 is a plane view illustrating a terminal support part of a load beam of the suspension shown in FIG. 8.

First, the flexure 80 with the thin film conductive pattern is formed. This thin film conductive pattern mainly includes the first connection terminal part 89 which is positioned near one end of the flexure 80 and is to be directly connected to a magnetic head slider, the connection conductors 83–86 which is electrically connected to the first connection terminal part 89 at its one end, and the second connection terminal part 90 which is positioned near the other end of the flexure 80 and is electrically connected to the other end of the connection conductors 83–86. Before or after the formation of this thin film conductive pattern, the load beam 81 provided with the terminal support part 81a protruded in a direction of the side of the load beam 81 is formed. As shown in FIG. 11, the slit 92 with a certain length is partially formed along the bending line 91 between the load beam 81 and the terminal support part 81a. The base plate 82 with a predetermined shape is prepared. The base end portion of the load beam 81 may be substituted for the base plate without preparing the individual base plate 82.

Then, the flexure 80 and the base plate 82 are fixed on the load beam 81 by spot welding using laser at several points. In this case, the other end portion of the load beam 81 is spot-welded on the terminal support part 81a so that the second connection terminal part 90 on the flexure 80 is fixed on this terminal support part 81a of the load beam 81. Thereafter, the terminal support part 81a is bent, along the bending line 91, to about 90° with respect to the surface of the base plate 82 so that the second connection terminal part 90 is outward appeared with respect to the base plate 82. Although the terminal support part 81a is bent to an angle of about 90° in the above description, this bending angle may be adaptively decided on condition that the connection work with the external circuit can be easily executed. It is possible to fix the flexure 80 to the load beam 81 by spot welding after bending the terminal support part 81a. However, in this case, the angle of the spot welding is changed for this part causing the work efficiency to lower.

Since the terminal support part 81a is bent after the other end portion of the flexure 80, on which the second connection terminal part 90 is formed, is fixed to the load beam 81, not only a good work efficiency can be obtained but also the bending angle of the terminal support part 81a can be freely determined. Also, since the slit 92 is partially formed along the bending line 91, no excess stress will be applied to the thin film conductive pattern on the flexure 80 such as the connection conductors 83–86 preventing the electrical characteristics such as electrical insulation or electrical resistance characteristics from deteriorating. Of course, the bending work will become easy.

Figure 12:
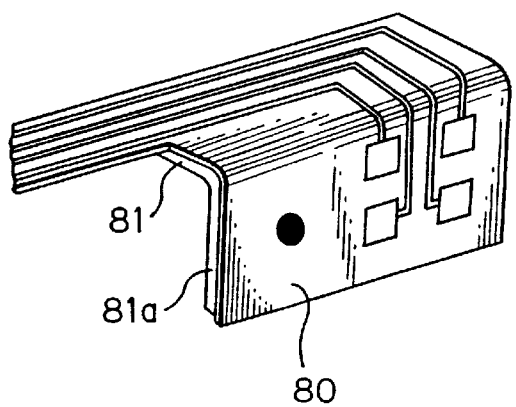
FIG. 12 is an oblique view illustrating a bending part of the load beam.

It is possible, as shown In FIG. 12, to simultaneously bent both the terminal support part 81a of the load beam 80 and the flexure 80 after the flexure 80 is tightly adhered on the load beam 81. However, according to this method, since the flexure 80 is sharply bent, distortion of the conductive layer and the insulation layer which constitute the thin film conductive lead pattern such as the connection conductors will increase to produce a microscopic destruction in the thin film layer or a crack in the conductive layer causing the electrical characteristics such as electrical insulation or electrical resistance characteristics to easily deteriorate. Contrary to this, according to this embodiment, the flexure 80 provided with the free movement part 80b which can freely move with respect to the load beam 81 at a position near the other end of this flexure 80 is fixed to the load beam 81 by spot welding, and then only the terminal support part 81a is bent to an arbitrary angle. Therefore, even if the terminal support part 81a is bent after the fixing of the flexure 80 to the load beam 81, excess stress will not be applied to the thin film conductive pattern on the flexure 80 such as the connection conductors 83–86 preventing the electrical characteristics from deteriorating.

According to this embodiment, as described above, the second connection terminal part 90 of the thin film conductive pattern formed on the flexure 80 is positioned on the terminal support part 81a by attaching the other end portion of the flexure 80 to this terminal support part 81a which is protruded from the side edge of the base plate 82. Thus, the second connection terminal part 90 can be directly connected, without using lead wires, to one end of the FPC connection cable the other end of which is connected to the external circuit such as an electronic circuit for recording and reproducing signals. As a result, the connection of the lead lines will not affect the flying characteristics of the slider, particularly motion of the slider for roll, and an electrical resistance of the lead lines can be decreased. Also, any breakage of the wires can be prevented from occurring during connection works resulting the fraction defective of manufacturing to maintain without increasing.

Furthermore, since the second connection terminal part 90 is fixed to the terminal support part 81a which is bent to an arbitrary angle with respect to the surface of the base plate 82, the connection terminals 83b–86b are outward appeared with respect to the base plate 82 resulting that the connection work with the FPC can be easily done. Also, because the position of the connection terminals 83b–86b is settled, the connection work of the lead lines with the external circuit can be automatically executed by a connection machine. As a result, the manufacturing cost with respect to the connection can be reduced. Furthermore, since the flexure 80 is attached to the load beam 81 along the whole length of the load beam, a good damper effect can be expected.

Figure 13:
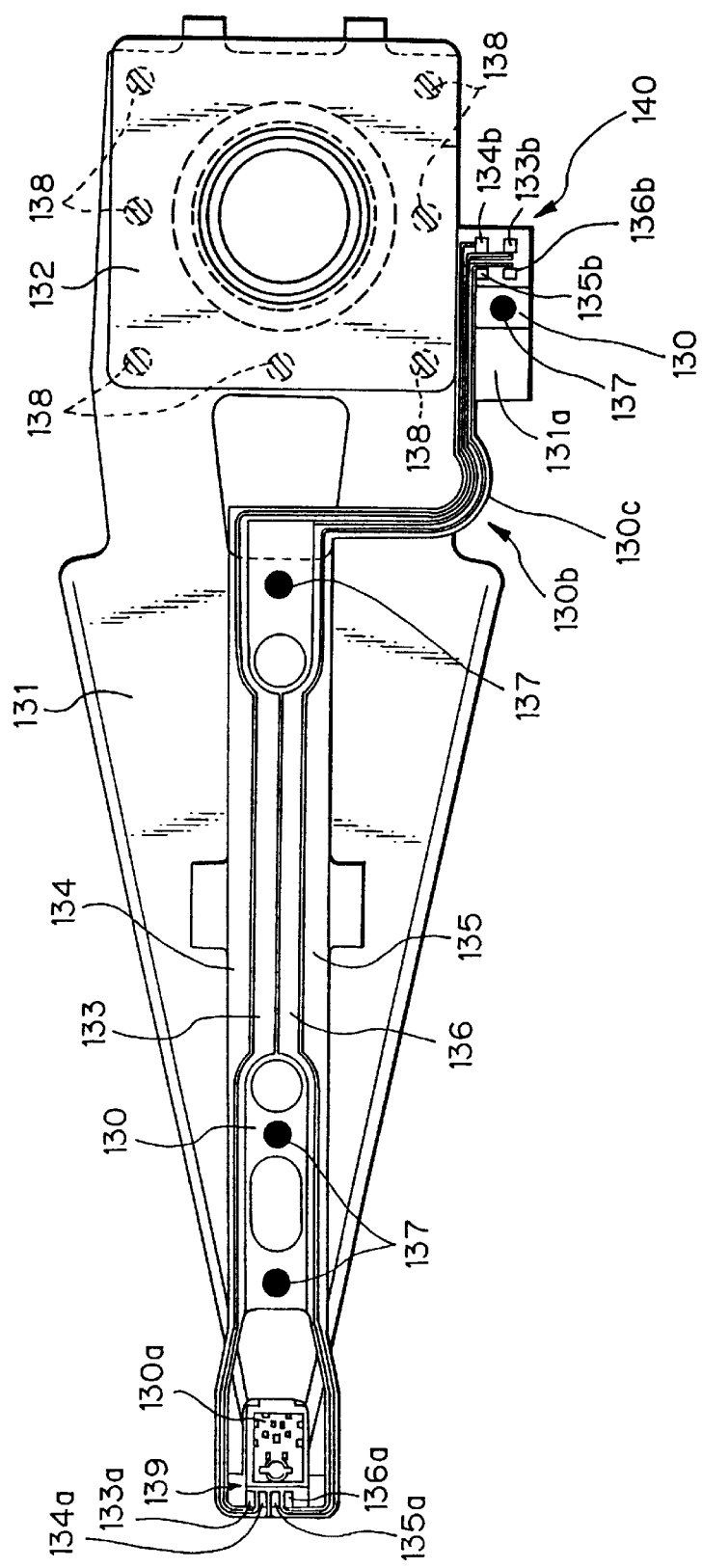
FIG. 13 is a plane view of a suspension used in a further embodiment according to the present invention.

FIG. 13 shows a suspension of a further embodiment according to the present invention.

In the figure, reference numeral 130 denotes the resilient flexure for supporting, by means of its tongue 130a formed near one end of the flexure 130, a magnetic head slider similar to that shown in FIG. 1, 131 denotes the load beam for supporting and fixing the flexure 130, and 132 denotes a base plate fixed to a base end portion of the load beam 131.

The load beam 131 has a terminal support part 131a which is protruded from the side edge of the base plate 132 and is bent to an angle of about 90° with respect to the surface of the base plate 132. In FIG. 13, however, this terminal support part 131a is illustrated in a state before bending. On the terminal support part 131a, the other end of the flexure 130 on which a second connection terminal part (140) is positioned is fixed. Although the terminal support part 131a is bent to an angle of about 90° in this embodiment, this bending angle may be adaptively decided on condition that the connection work with the external circuit can be easily executed. Smaller bending angle is advantageous because the protruding length of the terminal support part 131a will be decreased.

Figure 14:
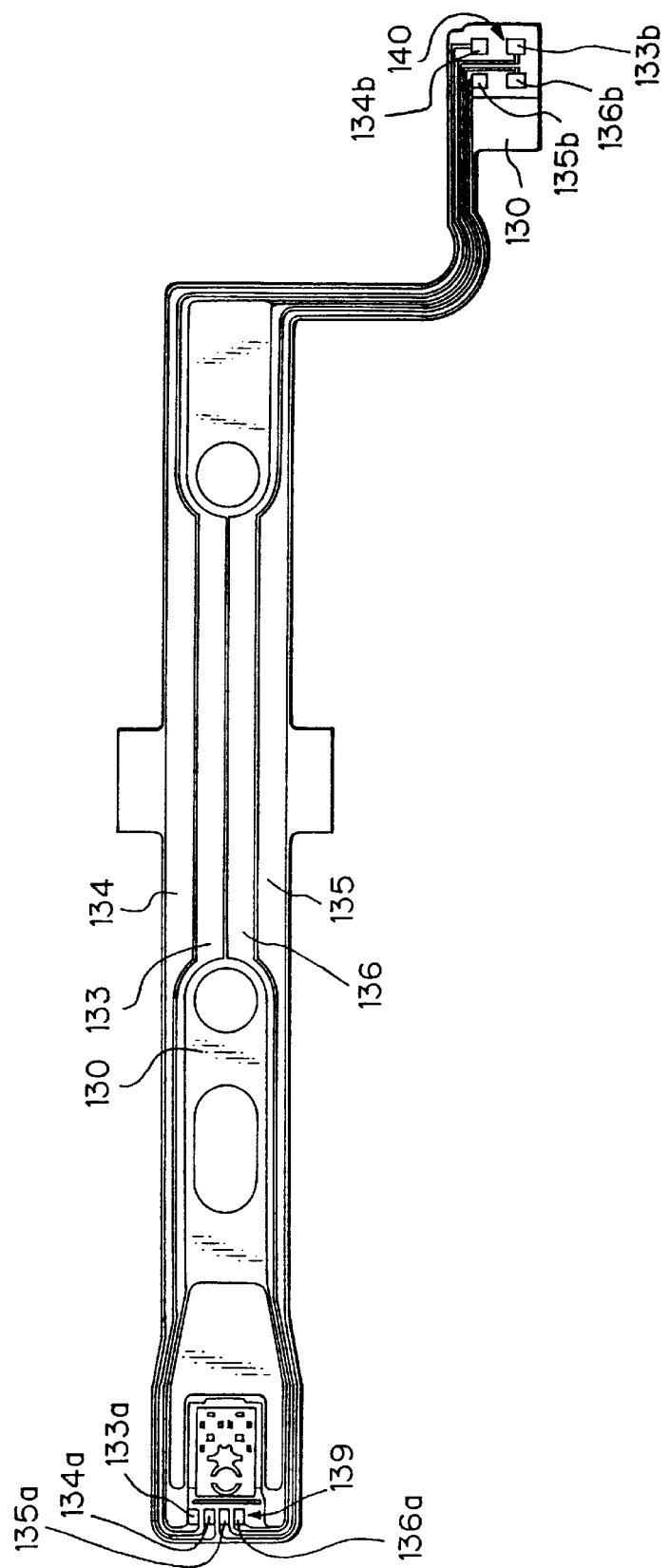
FIG. 14 is a plane view illustrating in detail a flexure used in the embodiment shown in FIG. 13.

The flexure 130 is made of in this embodiment a stainless steel plate (for example SUS304TA) with a thickness of about 25 μm. FIG. 14 illustrates in detail the structure of this flexure 130. As will be understood from this figure, on the flexure 130, four connection conductors 133–136 of thin film conductive pattern are formed along its whole length, as for lead lines. Near one end of the flexure 130, a first connection terminal part 139 consisting of connection terminals 133a–136a which are to be directly connected to the magnetic head slider is formed on the flexure 130 in a configuration of the thin film conductive pattern. Near the other of the flexure 130, the second connection terminal part 140 consisting of connection terminals 133b–136b which are to be directly connected to the connection cable of FPC similar to the FPC 19 shown in FIG. 1 is formed on the flexure 130 in a configuration of the thin film conductive pattern. These connection terminals 133a–136a and 133b–136b are electrically connected with each other by means of the connection conductors 133–136, respectively.

The thin film conductive pattern can be formed by a well known method similar to the patterning method of forming a printed circuit board on a thin metal plate. Namely, the conductive pattern are formed by sequentially depositing a polyimide layer with a thickness of about 5 $\mu$m (lower insulating material layer), a patterned Cu layer with a thickness of about 4 $\mu$m (conductive material layer), and a polyimide layer with a thickness of about 5 $\mu$m (upper insulating material layer) on the flexure 130 in this order. Within the regions of the connection terminals 133a–36a and 133b–136b, a Ni layer and an Au layer are sequentially deposited on the Cu layer and there is no upper insulating material layer. In order to easily understand the structure, the connection conductors 133–136 are indicated by solid lines in FIGS. 13 and 14.

The load beam 131 is made of in this embodiment a stainless steel plate with a thickness of about 62–76$\mu$m and supports the flexure 130 along its whole length by fixing it at a plurality of points. As mentioned above, this load beam 131 has the terminal support part 131a protruded from the side edge of the base plate 132 and bent to an angle of about 90° with respect to the surface of the base plate 132. On the terminal support part 131a, the other end portion of the flexure 130 on which the second connection terminal part 140 is positioned is fixed so that this second connection terminal part 140 is outward appeared with respect to the base plate 132.

Fixing of the flexure 130 to the load beam 131 is achieved at a plurality of welded spots 137 by laser welding for example. Fixing of the other end of the flexure 130 to the terminal support part 131a is also achieved at welded spots 137 by laser welding for example. Since the flexure 130 and the load beam 131 are fixed to each other by means of the welded spots, the flexure 130 will have a free movement part 130b which can freely move with respect to the load beam 131 at a position near the other end of the flexure 130. Therefore, even if the flexure 130 is fixed to the load beam 131, excess stress will not be applied to the thin film conductive pattern on the flexure 130 such as the connection conductors 133–136.

In this embodiment, particularly, the free movement part 130b in the flexure 130 has a play 130c curved to provide an anti-twist function. Thanks for the play 130c, the free movement part 130b can more freely move. As a result, no excess stress is applied to the thin film conductive pattern on the flexure 130 even if a part of the flexure 130 is distorted during the bending. Therefore, it is very advantageous for preventing the electrical characteristics from deteriorating.

A slit which is not clearly shown in FIG. 1 may be partially formed along a bending line for the terminal support part 131a, with which the terminal support part 131a is easily bent.

The base plate 132 is made of a stainless steel or iron and is fixed to the base end portion of the load beam 131 by means of welded spots 138. In a modification, the base end portion of the load beam 131 may be constructed to function as a base plate instead of preparing and attaching the individual base plate 132.

The structure of the suspension in this embodiment is the same as that in the embodiment of FIG. 8 except that the curve play 130c is formed in the flexure 130. Also, functions and advantages in this embodiment are the same as those in the embodiment of FIG. 8 except that, by forming the play 130c, no excess stress is applied to the thin film conductive pattern on the flexure 130 even if a part of the flexure 130 is distorted during the bending and thus the electrical characteristics can be certainly prevented from deteriorating.

Figure 15:
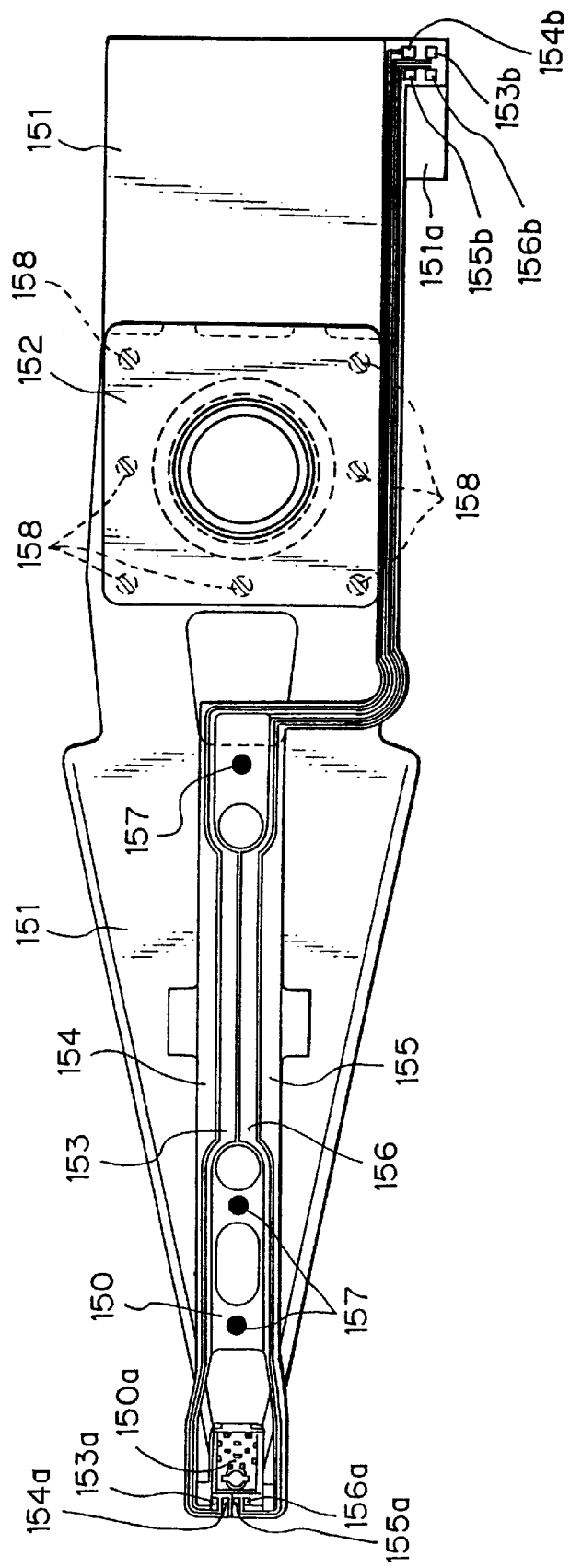
FIG. 15 is a plane view of a suspension used in a still further embodiment according to the present invention.

FIG. 15 shows a suspension of a still further embodiment according to the present invention.

In the figure, reference numeral 150 denotes the resilient flexure for supporting, by means of its tongue 150a formed near one end of the flexure 150, a magnetic head slider similar to that shown in FIG. 1, 151 denotes the load beam for supporting and fixing the flexure 150, and 152 denotes a base plate fixed to a base end portion of the load beam 151.

The other ends of both the load beam 151 and the flexure 150 in this embodiment extend beyond a rear edge (edge on the side opposite to the slider side) of the base plate 152.

The flexure 150 is made of in this embodiment a stainless steel plate (for example SUS304TA) with a thickness of about 25 $\mu$m. If the flexure is made of a plastic material, a poor flatness of the surface to which the slider is mounted and/or large angle variations between the slider mounting surface and the surface to which the drive arm is attached may occur. However, according to this embodiment, since the flexure 150 is formed by the stainless steel plate, there will occur no such troubles.

On the flexure 150, four connection conductors 153–156 of thin film conductive pattern are formed along its whole length, as for lead lines. Near one end of the flexure 150, connection terminals 153a–156a to be directly connected to the magnetic head slider are formed on the flexure 150 in a configuration of the thin film conductive pattern. Near the other of the flexure 150, connection terminals 153b–156b to be directly connected to the connection cable of FPC similar to the FPC 19 shown in FIG. 1 are formed on the flexure 150 in a configuration of the thin film conductive pattern. These connection terminals 153a–156a and 153b–156b are electrically connected with each other by means of the connection conductors 153–156, respectively.

The thin film conductive pattern can be formed by a well known method similar to the patterning method of forming a printed circuit board on a thin metal plate. Namely, the conductive pattern are formed by sequentially depositing a polyimide layer with a thickness of about 5 $\mu$m (lower insulating material layer), a patterned Cu layer with a thickness of about 4 $\mu$m (conductive material layer), and a polyimide layer with a thickness of about 5 $\mu$m (upper insulating material layer) on the flexure 150 in this order. Within the regions of the connection terminals 153a–156a and 153b–156b, a Ni layer and an Au layer are sequentially deposited on the Cu layer and there is no upper insulating material layer. In order to easily understand the structure, the connection conductors 153–156 are indicated by solid lines in FIG. 15.

The load beam 151 which extends beyond the base plate 152 is made of in this embodiment a stainless steel plate with a thickness of about 62–76 $\mu$m and supports the flexure 150 along its whole length. Fixing of the flexure 150 to the load beam 151 is achieved at a plurality of welded spots 157 by laser welding for example. This load beam 151 has a terminal support part 151a laterally protruded from its side edge near the rear end of the base plate 152. On the terminal support part 151a, the other end portion of the flexure 150 on which the connection terminals 153b–156b are positioned is fixed.

The base plate 152 is made of a stainless steel or iron and is fixed to the base end portion of the load beam 151 by means of welded spots 158. Similar to the suspension 17 shown in FIG. 1, the suspension is attached to the top end portion of the drive arm 16 (FIG. 1) by fixing the base plate 152 thereto. In a modification, the base end portion of the load beam 151 may be constructed to function as a base plate instead of preparing and attaching the individual base plate 152.

The connection structure of the connection terminals 153a–156a formed near the top end of the flexure 150 and the signal terminals of the magnetic head slider 18 (FIG. 1), and the connection structure of the connection terminals 153b–156b formed on the flexure 150 and the connection cable of the FPC 19 (FIG. 1) in this embodiment is the same as those in the embodiment of FIG. 1 except that the connection terminals 153b–156b are positioned in the rear of the base plate 152, in other words the connection terminals 153b–156b lie halfway between the ends of the drive arm 16 when the suspension 17 is attached to this drive arm 16. Also, functions and advantages in this embodiment are the same as those in the embodiment of FIG. 1 except that the connection work of the connection terminals 153b–156b with the FPC connection cable can be more easily executed because these connection terminals are more rearward positioned.

Figure 16:
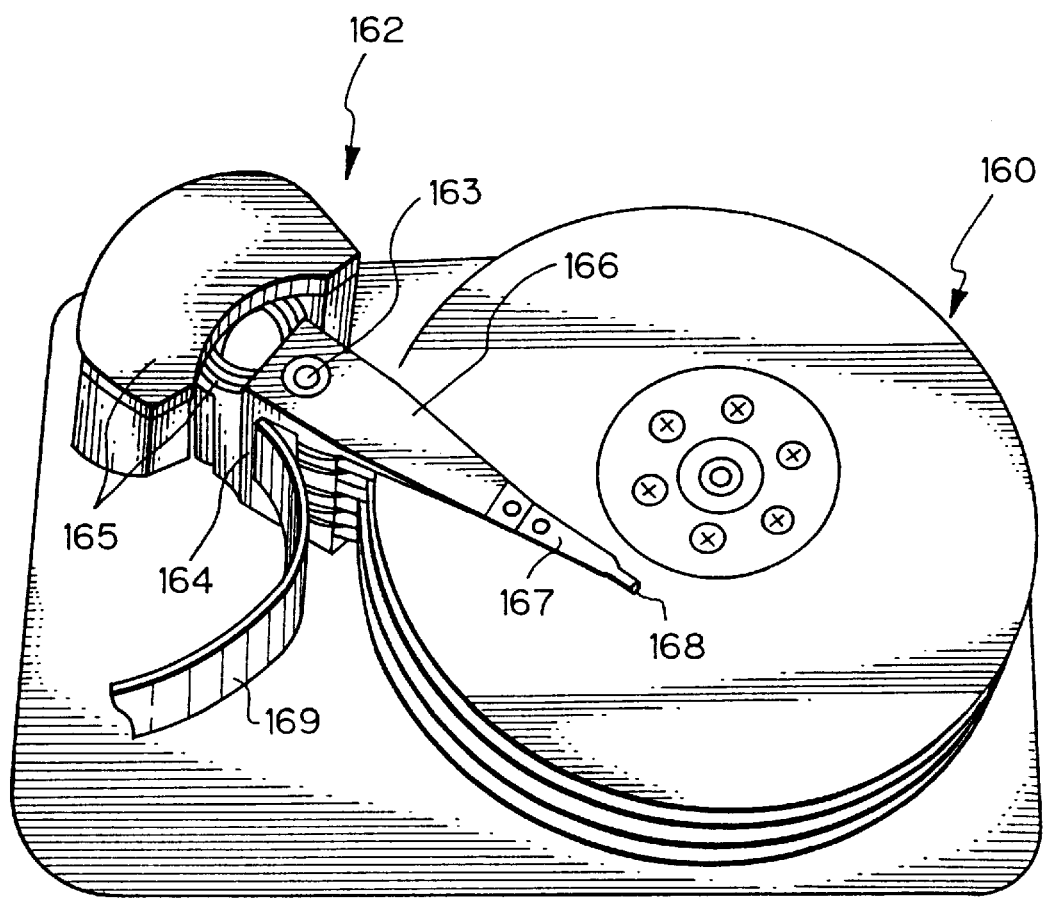
FIG. 16 is an oblique view schematically illustrating a part of a magnetic disk drive apparatus in an another embodiment according to the present invention.

FIG. 16 schematically illustrates a part of a magnetic disk drive apparatus in an another embodiment according to the present invention.

In the figure, reference numeral 160 denotes a plurality of magnetic disks rotating around an axis 161, and 162 denotes an assembly carriage device for positioning a magnetic head slider on a track of the disk. The assembly carriage device 162 is mainly constituted by a carriage 164 rotatable around an axis 163 and an actuator 165 such as for example a voice coil motor (VCM) for driving the carriage 164 to rotate.

Base portions at one ends of a plurality of drive arms 166 are attached to the carriage 164, and a plurality of suspensions 167 are mounted on top portions at the other ends of the arms 166, respectively. A magnetic head slider 168 is fixed to a top end portion of each of the suspensions 167.

A slider-suspension assembly constituted by the suspension 167 and the magnetic head slider 168 fixed to the suspension 167 is attached to the top end portion of the each drive arm 166 so that each of the magnetic head slider 168 opposes to the each surface of the magnetic disks 160. Only one slider-suspension assembly is attached to each of the top and bottom drive arms 166, whereas two slider-suspension assemblies are attached to each of the drive arms 166 between the adjacent magnetic disks.

Branched top portions at one end of a connection cable formed by a flexible printed circuit (FPC) 169 which is connected at the other end thereof to an integrated circuit element for recording and reproducing signals (not shown) are positioned near the top end portions of the respective drive arms 16 of the carriage 164.

Figure 17:
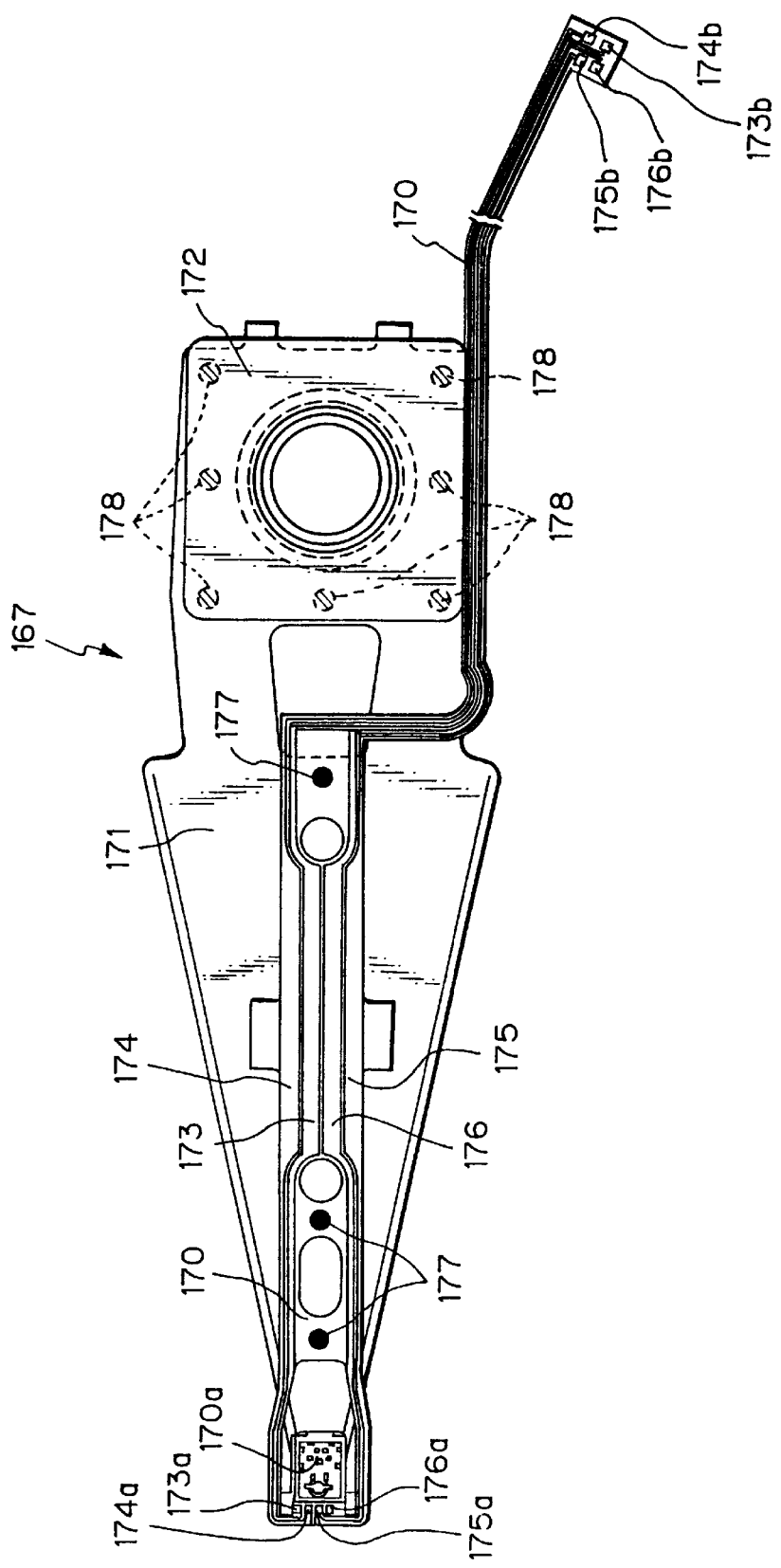
FIG. 17 is a plane view of the suspension used in the embodiment shown in FIG. 16.

FIG. 17 shows the suspension 167 of the embodiment shown in FIG. 16. In the figure, reference numeral 170 denotes the resilient flexure for supporting, by means of its tongue 170a formed near one end of the flexure 170, a magnetic head slider similar to that shown in FIG. 1, 171 denotes the load beam for supporting and fixing the flexure 170, and 172 denotes a base plate fixed to a base end portion of the load beam 171.

The other end of the flexure 170 in this embodiment extend beyond a rear edge (edge on the side opposite to the slider side) of the base plate 172 so as to form a flexible free end which will not fixed to the load beam 171.

The flexure 170 is made of in this embodiment a stainless steel plate (for example SUS304TA) with a thickness of about 25 $\mu$m. If the flexure is made of a plastic material, a poor flatness of the surface to which the slider is mounted and/or large angle variations between the slider mounting surface and the surface to which the drive arm is attached may occur. However, according to this embodiment, since the flexure 170 is formed by the stainless steel plate, there will occur no such troubles.

On the flexure 170, four connection conductors 173–176 of thin film conductive pattern are formed along its whole length, as for lead lines. Near one end of the flexure 170, connection terminals 173a–176a to be directly connected to the magnetic head slider are formed on the flexure 170 in a configuration of the thin film conductive pattern. Near the other of the flexure 170, connection terminals 173b–176b to be directly connected to the connection cable of FPC similar to the FPC 169 shown in FIG. 16 are formed on the flexure 170 in a configuration of the thin film conductive pattern. These connection terminals 173a–176a and 173b–176b are electrically connected with each other by means of the connection conductors 173–176, respectively.

The thin film conductive pattern can be formed by a well known method similar to the patterning method of forming a printed circuit board on a thin metal plate. Namely, the conductive pattern are formed by sequentially depositing a polyimide layer with a thickness of about 5 $\mu$m (lower insulating material layer), a patterned Cu layer with a thickness of about 4$\mu$m (conductive material layer), and a polyimide layer with a thickness of about 5 $\mu$m (upper insulating material layer) on the flexure 170 in this order. Within the regions of the connection terminals 173a–176a and 173b–176b, a Ni layer and an Au layer are sequentially deposited on the Cu layer and there is no upper insulating material layer. In order to easily understand the structure, the connection conductors 173–176 are indicated by solid lines in FIG. 17.

The load beam 171 which extends beyond the base plate 172 is made of in this embodiment a stainless steel plate with a thickness of about 62–76 $\mu$m and supports the flexure 170 along its whole length. Fixing of the flexure 170 to the load beam 171 is achieved at a plurality of welded spots 177 by laser welding for example. In this embodiment, a part of the flexure 170 extends beyond the rear end of the load beam 171 so that the rear end of the flexure 170 and the connection terminals 173b–176b constitute the free end.

The base plate 172 is made of a stainless steel or iron and is fixed to the base end portion of the load beam 171 by means of welded spots 178. Similar to the suspension 167 shown in FIG. 16, the suspension is attached to the top end portion of the drive arm 166 (FIG. 16) by fixing the base plate 172 thereto. In a modification, the base end portion of the load beam 171 may be constructed to function as a base plate instead of preparing and attaching the individual base plate 172.

The connection structure of the connection terminals 173a–176a formed near the top end of the flexure 170 and the signal terminals of the magnetic head slider 168 (FIG. 16) in this embodiment is the same as that in the embodiment of FIG. 1.

Figure 18:
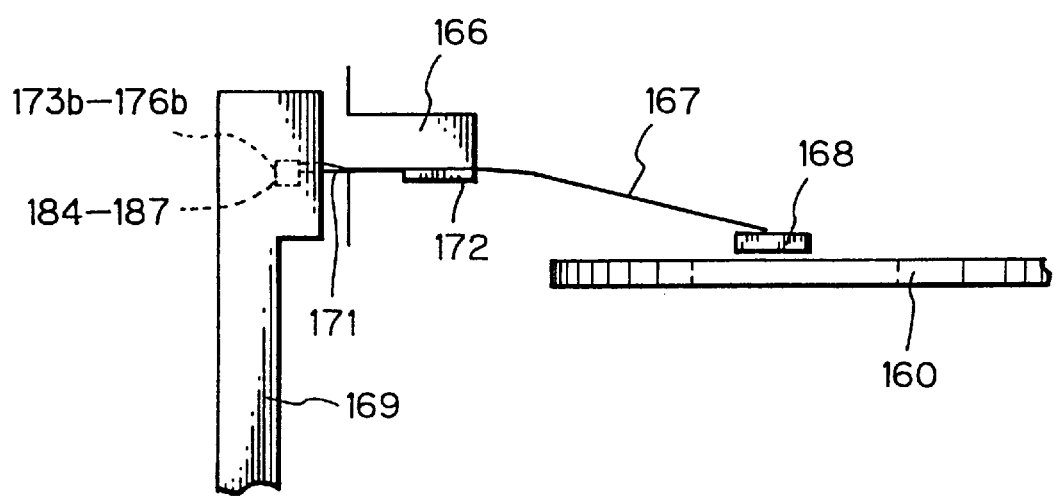
FIG. 18 is a side view schematically illustrating a connection structure between a connection conductor of a flexure shown in FIG. 17 and a connection cable of the FPC.

Referring to FIG. 18 which schematically illustrates a connection structure between a connection conductor of a flexure shown in FIG. 17 and a connection cable of the FPC, the connection structure of the conductors 173–176 and the FPC connection cable 169 (FIG. 16) is described hereinafter.

As will be apparent from FIG. 18, the connection terminals 173b–176b connected with the other ends of the connection conductors 173–176 of the each suspension 167 extend beyond the base plate 172 and position in the rear of the load beam 171. The branched top portions at one end of the FPC 169 which is connected at the other end thereof to an integrated circuit element for recording and reproducing signals do not extend to the end of the drive arm 166 but lie halfway on the drive arm 166. On each of the branched top portions of the FPC 169, cable terminals 184–187 connected with the cable are formed.

Thus, the connection of the lead lines can be completed by directly connecting, at the position of the carriage 164, the connection terminals 173b–176b on the flexure 170 with the cable terminals 184–187 of the FPC 169 for each of the slider-suspension assemblies by means of welding for example.

Functions and advantages in this embodiment are the same as those in the embodiment of FIG. 1 except that the connection work of the connection terminals 173b–176b with the FPC connection cable can be more easily executed because these connection terminals are positioned at the carriage 164 which is more rearward located.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a suspension for a magnetic head slider comprising the steps of:

forming a resilient flexure having a) a first connection terminal part positioned near one end of said flexure and to be connected to the magnetic head slider, b) a second connection terminal part positioned near the other end of said flexure, and c) connection conductors with both ends connected respectively with said first and second connection terminal parts, in a thin film pattern;

forming a load beam having one end portion and a terminal support part protruded from a side edge of said one end portion of said load beam;

attaching said flexure on said load beam so that said second connection terminal part is fixed on said terminal support part and so that said flexure has a free movement part near said other end of the flexure, said free movement part being capable of freely moving without applying excess stress to said thin film pattern of said flexure when said load beam is bent; and thereafter bending said terminal support part of said load beam by an arbitrary angle so that said second connection terminal part faces outwardly at a position of said terminal support part.

2. The method as claimed in claim 1, wherein said load beam forming step includes a step of forming a slit for providing less resistance when said terminal support part is bent.

3. A method of manufacturing a suspension for a magnetic head slider comprising the steps of:

forming a resilient flexure having a) a first connection terminal part positioned near one end of said flexure and to be connected to the magnetic head slider, b) a second connection terminal part positioned near the other end of said flexure, and c) connection conductors with both ends connected respectively with said first and second connection terminal parts, in a thin film pattern;

forming a load beam having one end portion and a terminal support part protruded from a side edge of said one end portion of said load beam;

attaching said flexure on said load beam so that said second connection terminal part is fixed on said terminal support part and so that said flexure has a free movement part near said other end of the flexure, said free movement part having a play curved to provide an anti-twist function in order to freely move without applying excess stress to said thin film pattern of said flexure when said load beam is bent; and thereafter, bending said terminal support part of said load beam by an arbitrary angle so that said second connection terminal part faces outwardly at a position of said terminal support part.

* * * * *